United States Patent [19]

Billington

[11] Patent Number: 4,523,243

[45] Date of Patent: Jun. 11, 1985

[54] MAGNETORESISTIVE TRANSDUCER USING AN INDEPENDENT RECESSED ELECTROMAGNETIC BIAS

[75] Inventor: Robert L. Billington, Lafayette, Colo.

[73] Assignee: Storage Technology Corporation

[21] Appl. No.: 381,387

[22] Filed: May 24, 1982

[51] Int. Cl.³ ........................... G11B 5/12; G11B 5/30; H01L 43/02; G01R 33/02

[52] U.S. Cl. .................................. 360/113; 235/449; 338/32 R; 324/252

[58] Field of Search ............... 360/113, 126, 114, 122; 235/449; 338/32 R; 324/252

[56] References Cited

U.S. PATENT DOCUMENTS

| | | | |
|---|---|---|---|
| 3,813,692 | 5/1974 | Brock | 360/113 |
| 4,065,797 | 12/1977 | Nomura | 360/113 |
| 4,277,808 | 7/1981 | Nagaki | 324/252 |
| 4,413,296 | 11/1983 | Jeffers | 338/32 R |
| 4,439,671 | 3/1984 | Helle | 235/449 |

Primary Examiner—Robert M. Kilgore
Attorney, Agent, or Firm—Bryant R. Gold

[57] ABSTRACT

An improved magnetoresistive transducer for sensing the magnetic fields recorded on a magnetic medium and suitable for fabrication using photolithographic techniques. The transducer has two separate metallization layers so that the bias conductor may be deposited opposite the magnetoresistive sense element without any electrical connection between the two, thereby allowing the sense currents and bias currents to each be independently optimized and allowing the same bias current to be used to bias each magnetoresistive transducer element in an array. The bias conductor is set back from the edge of the magnetoresistive transducer element which is closest to the magnetic medium, providing a number of advantages related to wear, to decreasing the possibility of a short circuit between the bias conductor and the transducer element, and to reducing the exposure of the bias conductor to environmental hazards.

25 Claims, 2 Drawing Figures

MAGNETORESISTIVE TRANSDUCER USING AN INDEPENDENT RECESSED ELECTROMAGNETIC BIAS

BACKGROUND OF THE INVENTION

1. Field of the Invention

The invention relates to the field of thin film magnetoresistive transducers used for sensing the magnetic field recorded on magnetic recording media.

2. Prior Art

A magnetoresistive element changes resistance as a function of the strength and direction of the magnetic field to which it is exposed. In use, a sense current is applied to the magnetoresistive element. Then, as the magentic medium passes the magnetoresistive element, the resistance of the magnetoresistive element changes in response to the strength and direction of the magnetic field in the medium. The change in resistance produces corresponding voltage changes across the element.

Because of poor sensitivity and nonlinearity of the magnetoresistive effect in the region around zero applied magnetic field, most applications using magnetoresistive elements in a magnetic head require a fixed bias field to be applied by means of either a permanent magnet or an electromagnet in order to increase the sensitivity and linearity of the head.

Permanent magnets can be used to provide the necessary bias field, but for complex configurations, such as multitrack heads, practical designs are difficult to achieve. It is therefore preferable in such applications to use a current induced electromagnetic field for the bias.

One approach to supplying the necessary bias field has been to use a so-called shunt bias. In this arrangement, a magnetoresistive film is placed in electrical contact with a higher resistivity, non-magnetic conductive layer. The magnetoresistive layer is then mangetically biased by the portion of the sense current which is shunted through the nonmagnetic layer. This is the approach used in U.S. Pat. No. 3,813,692 issued to Brock, et al. An inherent characteristic of the shunt bias approach is that the sense and bias currents are not independently controllable, the relative amount of bias current being determined by the resistivity of the selected shunt material. In addition, the use of the shunt bias results in a loss of as much as 60% of the possible output signal. Also, excessive thermal noise can result from the use of some materials as the shunt, e.g., titanium.

Other techniques include the so-called barber pole configuration which avoids the need for a bias by driving the sense current at an angle to the sense element itself. The drawback of this configuration is that it is relatively complex lithographically and is not easily adaptable to small shielded sensor elements. Another technique, known as self-bias, uses a magnetoresistive element positioned non-symetrically in the gap of a shielded head. Because of preferential flux coupling to the closest shield, the needed bias is self-induced by the sense current flowing through the element.

SUMMARY OF THE INVENTION

The present invention uses two separate metallization layers on either side of a thin dielectric layer in order to form a magnetic head or an array of magnetic heads between ferrite shield elements for reading the magnetic signals recorded on the tracks of a magnetic medium. On a dielectrically coated ferrite substrate or member, one or more thin film magnetoresistive sense elements are deposited along with the conductors which are used to supply the sense current to the elements. The magnetoresistive elements may be Permalloy (nickel-iron) or other suitable material exhibiting the magnetoresistive effect. Over these elements is deposited a second dielectric layer. On this second dielectric layer, bias conductors are deposited opposite the sense elements. An additional dielectric layer is placed over the bias conductors to separate the bias conductors from a second ferrite member before it is placed thereupon in order to shield the head from extraneous magnetic fields.

Unlike the shunt bias arrangement to which it is functionally similar, in the present invention there is no electrical connection between the bias conductor located on one side of the second dielectric layer and the magnetoresistive sense element located on the other. This allows the use of low resistivity materials for the bias conductor, thereby alleviating power dissipation problems that exist with the above-described shunt bias designs. In addition, because of the electrical isolation between the magnetoresistive sense elements and the bias conductor, the signal strength is not compromised by shunting. The present invention also allows the sense current and the bias current to be independently adjusted so that each may be individually optimized.

The bias conductor is set back from the edge of the magnetoresistive sense element and thus does not directly overlap the entire element. A number of advantages accrue from recessing the bias conductor in this manner. Possible shorting of the bias conductor to the sense elements is prevented; the bias conductor is less susceptible to environmental attack since it is recessed away from the magnetic medium; and in terms of transducer head wear, recessing the bias conductor eliminates bias current changes over the head lifetime.

DESCRIPTION OF THE PREFERRED EMBODIMENT

The present invention will be described in terms of a preferred embodiment in which Permalloy sense elements are used in an array to read different tracks spaced across a magnetic recording medium. Preferably, the Permalloy sense elements are each connected in a differentially amplified configuration as is known in the art. A separate sense current is applied to each half of each Permalloy sense element at its ends, and a conductor located in the middle of the sense element serves as a common terminal for the sense currents. In a differentially amplified configuration, the two halves of the Permalloy sense element for each track are oppositely biased, and the signals resulting from each half of the Permalloy sense element are differentially amplified. The advantages to the differentially amplified configuration are that second harmonic distortion is cancelled and thermal fluctuation noise is reduced.

The use of separate metallization layers on either side of a thin dielectric layer enables the Permalloy sense elements for each track to be located on one side of the dielectric layer and the bias conductor to be placed opposite the Permalloy sense elements on the other side of the dielectric layer. The use of the two metallization layers also allows the number of external connnections necessary for the bias conductor to be limited to two no matter how many tracks or sense elements are required, thus assuring that the same bias current acts on each half element for each track. This is possible because the necessary bias conductors are located on one side of the dielectric layer and the other side of the dielectric layer is used, as necesary, to provide the required jumpers in order to allow the bias conductor to cross over itself at particular points.

Another feature of the invention is the recessing of the bias conductors from the edge of the Permalloy sense element that faces the magnetic medium. This provides advantages related to reliablity. Moreover, in a differentially amplified configuration, those parts of the Permalloy sense elements which are not overlapped by the bias conductor are essentially inactive. Thus, as the edge of the Permalloy sense elements facing the magnetic medium are worn down during use, the change in the level of the output signal over time will be relatively small. There will be some change as the amount of flux coupled back to the active portions of the elements will increase with wear. In addition, the bias conductor, being recessed, is not itself subjected to wear, and the bias current thus remains unchanged during the life of the transducer head.

Figure 1:
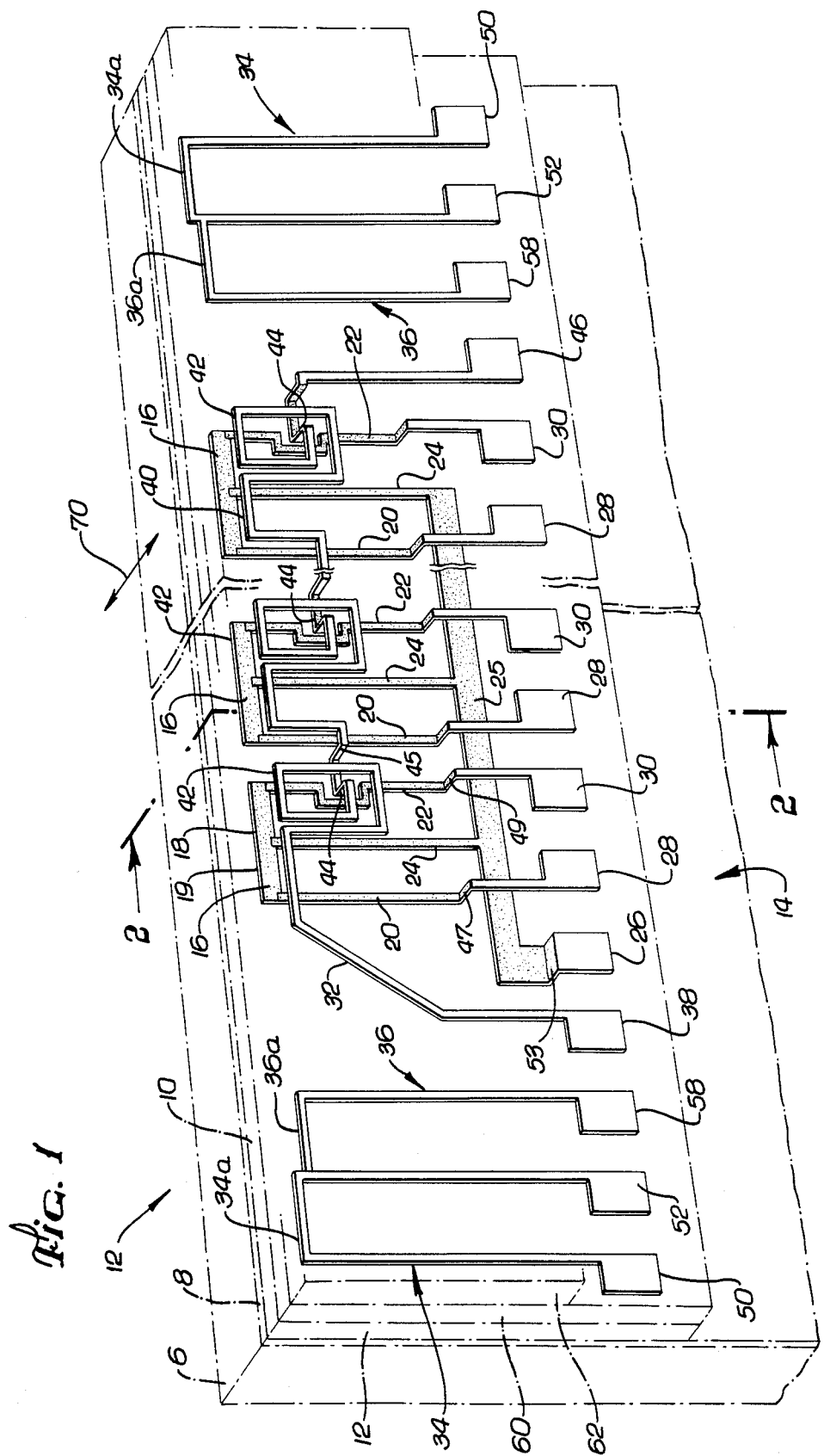
FIG. 1 shows an embodiment of the present invention before milling and lapping, with dielectric layers and ferrite members drawn in phantom so that the magnetoresistive elements and conductors may be viewed.

A more detailed description of the device of the preferred embodiment of the present invention will be given with respect to FIGS. 1 and 2. In FIG. 1, the ferrite shield members 6 and 62 and the dielectric layers 8, 10 and 60 are shown in phantom in order that the magnetoresistive sense elements 16 and the various conductive elements may be viewed.

The magnetoresistive head is fabricated by starting with a ferrite substrate 6 that has a broad, planar, rectangular surface. A silicon nitride dielectric layer 8 is then deposited on to the surface of the ferrite substrate 6. A layer of Permalloy material is deposited on the dielectric layer 8 and suitably etched to produce the magnetoresistive sense elements 16. The sense elements 16 are positioned to correspond to the tracks on a magnetic medium, with the edges 18 of the sense elements 16 defining a line which may be placed in close proximity, during deployment of the transducer head array, to a magnetic medium. The tracks of the medium traverse a path perpendicular to the edges 18, as indicated by an arrow 70.

Standard photolithographic techniques are used to deposit the three copper conductors 20, 22 and 24 for each sense element 16 over the dielectric layer 8 and the rear edges 19 of the sense element 16. Two of these conductors, 20 and 22, are deposited to contact the rear edge 19 of the corresponding sense element 16 at each of its ends. The third conductor 24 for each sense element 16 contacts the rear edge 19 of the sense element 16 at the center. The conductors 24 for each sense element 16 are connected together by means of a conductor 25, also photolithographically deposited on the dielectric layer 8.

At this point, another dielectric layer 10 is deposited over the copper conductors 20, 22, 24, and 25, over the magnetoresistive sense elements 16 and over the remainder of the formerly deposited silicon nitride dielectric layer 8. Through-holes which will be used to connect conductive elements on the two sides of the dielectric layer 10 are then provided in the dielectric layer 10 at 44, 45, 47, 49, and 53. Thereafter, conductors are photolithographically deposited over the dielectric layer 10 and in the through-holes 44, 45, 47, 49, and 53. These conductors include the bias conductor 32 as well as lap straps 34 and wear indicators 36, the functions of which will be subsequently described, and contact pads such as 26, 28, etc., in order to facilitate easy electrical connection of the magnetoresistive head to an electrical connector.

Once the conductors are deposited on the dielectric layer 10, a final dielectric layer 60 is then deposited over the conductors and the dielectric layer 10. This dielectric layer 60 is provided with openings 74 so that electrical contact can be made with the contact pads 26, 28, etc. A second ferrite member 62 may then be placed into contact with dielectric layer 60. The ferrite members 6 and 62 placed on either side of the Permalloy sense elements 16 are used to shield the Permalloy sense elements 16 from the field due to portions of the magnetic medium that are not then being read by the transducer array and from other stray fields. This helps to enhance the resolution of the transducer head array.

Current is supplied to the sense elements 16 via conductor leads 20 and 22, with the conductor lead 24 serving as a common ground lead. Since the sense elements 16 respond to changing magnetic fields by varying their resistance, the currents flowing in the respective sense current circuits defined by the sense elements 16 and conductor leads 20 and 24, on the one hand, and 22 and 24, on the other hand, will vary as the magnetic medium passes across the transducer. In operation, conductor leads 20 and 22 are connected to the inputs of differential amplifiers, so that the opposing currents in the sense element 16 can be differentially processed.

The bias conductor 32 as well as lap straps 34 and wear indicators 36 are located on the second side 14 of the dielectric layer 10. In the differentially amplified configuration shown, the electromagnetic bias applied to each half of a Permalloy sense element 16 must be in a direction opposite to that applied to the other half. Thus, bias conductor 32 originating at conductor pad 38 proceeds in a straight section 40 opposite the half of the Permalloy sense element 16 lying between the connections to conductors 20 and 24. Opposite the connection of bias conductor 24 to the Permalloy sense element 16, the bias conductor 32 is coiled so as to present a straight section 42 opposite the portion of the sense element 16 between the conductors 22 and 24. The coiling of the bias conductor causes bias current in the section 42 to flow in a direction opposite to the current flow in section 40.

At the end of the coiled section, the conductor 32 is jumpered at 44 to the first side 12 of the dielectric layer 10. This enables the conductor 32 to cross its previous path. It is then jumped back at 45 to the second side 14. For each succeeding sense element 16, the bias conductor includes straight sections 40 and 42 parallel to the sense element 16 in which bias current will flow in opposite directions. After proceeding across all the sense elements, the bias conductor 32 terminates at conductor pad 46.

Figure 2:
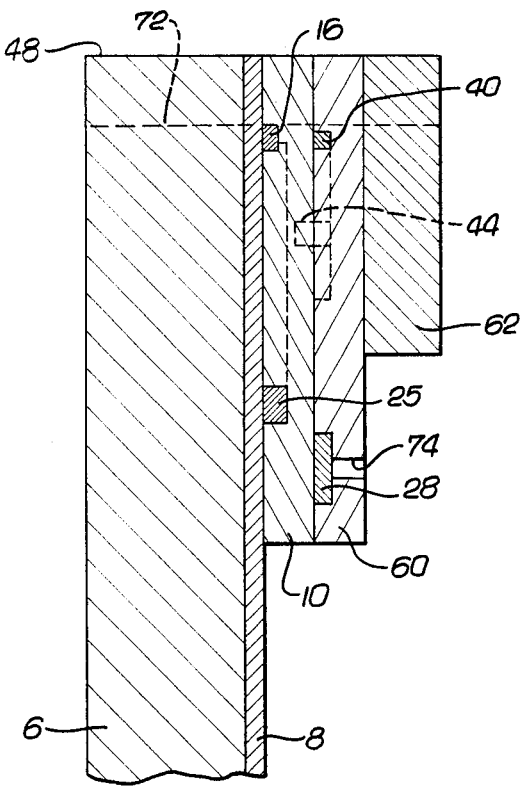
FIG. 2 is a cross-sectional view of the embodiment of the present invention shown in FIG. 1 taken along the lines 2—2 in FIG. 1.

After fabrication, the top portion 48 must be lapped to the line 72 shown in FIG. 2 so that the leading edges 18 of the sense elements 16 are near the edge of the transducer array for placement in close proximity with the magnetic medium. Final lapping of the head surfaces is a particularly critical operation. To help ensure that it proceeds to the correct depth and no further, lapping straps 34 are included in the depositions of the conductors on the second side 14 of the dielectric layer 10 at each end of the array. These lapping straps 34 electrically open (i.e., the sections 34a are completely lapped away) at precisely predetermined points. During lapping a voltage is applied to conductor pads 50 and 52 connected to the lapping straps 34. The resulting current flows through the lapping straps 34. The sections 34a of the lapping straps 34 are parallel to the leading edges 18 of the sense elements 16 and are positioned such that their lower edges are along the line defined by the leading edges 18. When the lapping procedure has continued to the point where the straight sections 34a of the lapping straps 34 have been lapped away completely, current will cease flowing in the straps 34 and, simultaneously, the leading edges 18 of the sense elements 16 will have been exposed. Signals resulting from the cessation of current flow will thus signal that the lapping procedure should be stopped.

In addition to the lapping straps 34, wear straps 36 are deposited at either end adjacent to lapping straps 34. These wear straps 36 have sections 36a which are parallel to and spaced a predetermined distance from the front edges 18 of the sense elements 16. Current normally flows through the wear straps 36. The wear straps 36 are spaced from the edges 18 by an amount such that when approximately 90% of the design wear of the sense elements 16 has occurred, the sections 36a will completely wear through. The flow of current will be interrupted, thus providing a signal indicating impending transducer head array failure. Thus, preventive action or service may be taken or scheduled before actual failure occurs.

It will be seen that the present invention, in its use of a metallization layer on each side of a dielectric layer allows the conductor leads of either metallization layer to be jumpered to the other and in particular allows all terminations to be made at conductor pads located on the same side of the dielectric layer. In addition, the connections necessary for the bias conductor are reduced to two, since the same current biases each half of each of the sense elements. Thus, the present invention greatly simplifies the termination problems of photolithographically- defined magnetoresistive transducer head arrays.

Another feature of the preferred embodiment is that the straight sections 40 and 42 of the bias conductor 32 are located on the second side 14 of the dielectric layer 10 recessed from the leading edges 18 of the sense elements 16 on the first side 12 of the dielectric layer 10. That is, when the top portion 48 is lapped so that the leading edges 18 of the sense elements 16 are exposed, the straight portions 40 and 42 of the bias conductor 32 will be set back from the edge of the dielectric layer 10. This reduces the number of materials exposed to environmental attack in the immediate vicinity of the magnetic medium, prevents possible shorting of the bias conductor to the sense elements, and also avoids changes in bias current as the transducer wears. In addition, because the parts of the sense elements that are not overlapped by the bias conductors are essentially inactive in a differentially amplified configuration, wear of the sense elements will cause a minimal amount of signal strength change.

While the present invention has been described in terms of a presently preferred embodiment, it will be appreciated that many variations are within the scope of the present invention. For example, the present invention has been described in terms of sense elements which are connected in a differentially amplified configuration. The present invention is, however, applicable to sense elements not connected in a differentially amplified configuration as well. In such configurations, the bias conductor need not reverse directions on either half of the magnetoresistive sense elements, and thus a simpler structure for the bias conductor would result. Similarly because there is some loss of signal strength due to recessing of the bias conductor, in some applications it may be desirable to recess the bias conductor a smaller amount or not at all. In such configurations, a single bias conductor for all the magnetoresistive sense elements having only two terminations could still be used. Thus, the scope of the invention is not intended to be limited to the above description but is best determined by the appended claims. /

I claim:

1. A thin film magnetoresistive transducer for sensing the magnetic field recorded on a magnetic medium, comprising:

a planar substrate;

a thin film magnetoresistive sense element located on the substrate at the edge thereof;

a plurality of conductive leads connected to the sense element for supplying sense current to the sense element in a differential configuration;

a first dielectric member deposited over said sense element, conductive leads, and substrate; and a bias conductor located on the first dielectric member opposite the sense element to provide a bias current therefor, wherein the bias conductor is electrically isolated from the sense element to facilitate separate optimization of bias and sense currents for the transducer.

2. A thin film magnetoresistive transducer head for sensing the magnetic field recorded on a magnetic medium as in claim 1 wherein said planar substrate comprises a first ferrite member and a second dielectric member deposited over the first ferrite member.

3. A thin film magnetoresistive transducer head for sensing the magnetic field recorded on a magnetic medium as in claim 2 further comprising:

a third dielectric member deposited over the bias conductor and the first dielectric member; and a second ferrite member placed in contact with said third dielectric member.

4. A thin film magnetoresistive transducer head for sensing the magnetic field of a magnetic medium comprising:

a substrate;

a thin film magnetoresistive sense element located on the substrate, said sense element having a first edge between its two ends for placement adjacent to said magentic medium;

first and second conductors located on the planar substrate, wherein each said conductor is attached to one end of the sense element;

a third conductor located on the planar substrate and attached to a middle portion of said sense element;

a first dielectric member located over said sense element, said substrate, and said first, second and third conductors; and a bias conductor located on the first dielectric member, wherein said bias conductor is electrically isolated from said sense element, said bias conductor including a first section located opposite the sense element between said first and third conductors and a second section in series with said first section for carrying the same bias current as said first section but in the direction physically opposite to which said current is carried by said first section, said second section being located opposite the sense element between said second and third conductors.

5. A thin film magnetoresistive transducer head as in claim 4 wherein said substrate is a first ferrite member having a planar surface over which a second dielectric member is deposited.

6. A thin film magnetoresistive transducer head as in claim 5 further comprising a second ferrite member adjacent said first dielectric member and said bias conductor, separated from said first dielectric member and said bias conductor by a thin dielectric member, said first and second ferrite members shielding said head from stray magnetic fields and improving its resolution.

7. A thin film magnetoresistive transducer head as in claims 4, 5 or 6 wherein the first and second sections of the bias conductor are recessed with respect to the first edge of said sense element so that said first and second sections do not contact said magnetic medium when said sense element is placed adjacent to said magnetic medium.

8. A thin film magnetoresistive transducer head according to claims 4, 5 or 6 wherein the second section is part of a coiled section connected to the first section.

9. A thin film magnetoresistive transducer head according to claims 4, 5 or 6 including a plurality of connector pads located on one side of the first dielectric member and including one or more jumpers which pass through the first dielectric member to connect conductors on the other side of the first dielectric member to the connector pads, wherein the remaining connector pads are connected to the conductors on the one side of the first dielectric member.

10. A thin film magnetoresistive transducer array for sensing the magnetic fields recorded on tracks of a magnetic medium comprising:
   a substrate;
   a thin film magnetoresistive sense element corresponding to each said track for which recorded magnetic field data is to be sensed, said elements located on the substrate at an edge thereof, each element having a first edge between its two ends for placement adjacent a corresponding track of a magnetic medium;
   a first conductor lead for each sense element attached to a middle portion of the sense element, wherein said first conductor leads are located on the substrate and are connected to a common point;
   a second conductor lead for each sense element attached to one end of the sense element and a third conductor lead for each element attached to the other end of the sense element, wherein said second and third conductor leads are located on said substrate;
   a thin dielectric member having a first side located over each sense element, each first, second and third conductor leads and said substrate;
   a bias conductor for carrying a current to bias said sense elements, said bias conductor located on the second side of the dielectric member opposite each sense element and electrically isolated from said sense elements, wherein current flows in the bias conductor parallel to the edge of the substrate and in opposite directions on each side of said first conductor lead of each element in order to oppositely bias the halves of the sense element on either side of said first conductor lead.

11. A thin film magnetoresistive transducer array as in claim 10 wherein said bias conductor includes for each sense element a first section opposite the portion of the sense element between the first and second leads and a second section opposite the portion of the sense element between the first and third leads, wherein the second section is part of a coiled section, said bias conductor further including, for each pair of adjacent sense elements, two jumper connections through the dielectric member and a section on said substrate to join said jumper connections for connecting the coiled section associated with one sense element to the first section associated with an adjacent sense element.

12. A thin film magnetoresistive transducer array as in claims 10 or 11 wherein said substrate comprises:
   a first ferrite member having a planar area on a surface thereof; and
   a first dielectric layer on said planar area which separates said ferrite member from said sense elements and said first, second and third conductor leads for each sense element.

13. A thin film magnetoresistive transducer array as in claim 12 further comprising a second ferrite member located proximate to said second side of said dielectric member and separated from said second side of said dielectric member and said bias conductor by a second dielectric layer, said first and second ferrite members shielding said array from stray magnetic fields and improving the resolution of said array.

14. A thin film magnetoresistive transducer array as in claim 10 wherein the bias conductor is set back with respect to the first edges of the sense elements so that it does not contact said magnetic medium when said sense elements are placed adjacent to said magnetic medium.

15. A thin film magnetoresistive transducer head providing improved signal level constancy over the life of the head comprising:
   a planar substrate;
   a magnetoresistive sense element located on the planar substrate and having a front edge between its two ends adjacent a front edge of the substrate;
   sense current conductors for providing separate currents to each end of the sense element, said currents flowing in opposite directions in each half of the sense element toward the middle of the sense element, said sense element having a common terminal attached to a point near the middle thereof;
   a dielectric member located over the sense element; and
   a bias conductor located on said dielectric member opposite said sense element and electrically isolated from it, said bias conductor having first and second conductive paths running parallel to said front edge of said element but set back therefrom, said conductive paths running in opposite directions over each half of said sense element.

16. A thin film magnetoresistive transducer assembly, comprising:
   a planar substrate;

a magnetoresistive sense element located on the planar substrate near an edge thereof, said sense element having a front edge substantially parallel to the edge of the planar substrate;

a dielectric layer located over said sense element;

a bias conductor located on the surface of the dielectric layer opposite the sense element and electrically isolated from said sense element;

at least one additional conductor, electrically isolated from said sense element and said bias conductor, located adjacent to a surface of the dielectric layer, said conductor including a front portion having a rear edge located a predetermined distance from a line including the front edge of the sense element, wherein said conductor can be utilized to provide an electrical wear indication of the transducer.

17. The transducer of claim 16 wherein the additional conductor is located to provide a wear indication to facilitate control of the lapping of the edge of the assembly to a predetermined position with respect to the front edge of the sense element.

18. The transducer of claim 16 wherein the additional conductor is located to provide an indication of a predetermined amount of wear of the sense element.

19. The transducer of claim 13 including a first additional conductor whose rear edge is located a first predetermined distance from the line including the front edge of the sense element and a second additional conductor whose rear edge is located a second predetermined distance from said line, wherein the first additional conductor is used to provide an indication to enable control of the lapping of the assembly so that its edge will be a predetermined distance from the front edge of the sense element and wherein said second additional conductor is used to provide an indication that a predetermined amount of wear of the sense element has occurred.

20. A thin film magnetoresistive transducer assembly comprising:

a ferrite substrate having a broad rectangular surface;

a first dielectric layer deposited on said ferrite substrate;

at least one magnetoresistive sense element deposited on said first dielectric layer;

for each sense element, a first conductor attached to one end of the sense element, a second conductor attached to the other end of the sense element, and a third conductor attached to the middle of the sense element, said conductors deposited on said first dielectric layer for providing currents which flow in opposite directions in each half of the sense element;

a second dielectric layer deposited over said at least one sense element, and said first, second and third conductors, and said first dielectric layer;

a bias conductor deposited on said second dielectric layer and having portions opposite at least one sense element for providing bias currents which travel in opposite directions on each side of said third conductor lead for each sense element, said bias conductor electrically isolated from said sense element and said first, second and third conductors;

a third dielectric layer deposited over said bias conductor and said second dielectric layer; and a ferrite member placed adjacent said third dielectric layer.

21. A thin film magnetoresistive transducer assembly as in claim 20 wherein said second dielectric layer has openings therethrough and said bias conductor has portions deposited on said first dielectric layer, said portions connected to said bias conductor on said second dielectric layer through said openings, so that said bias conductor can cross over its own path without electric contact.

22. In a thin film magnetoresistive transducer for sensing the magnetic field recorded on a magnetic medium, a photolithographically produced biased sensing element structure comprising:

a thin film magnetoresistive sense element;

first and second conductors, each said conductor attached to one end of said sense element;

a third conductor attached to a middle portion of said sense element, said first and third conductors forming a part of a circuit for providing a sense current to the part of the sense element between said first and third conductors and said second and third conductors forming a part of a circuit for providing a sense current to the part of the sense element between said second and third conductors;

a thin dielectric layer in contact on one side with said sense element; and a bias conductor in contact with the opposite side of said thin dielectric layer and located opposite said sense element, wherein said bias conductor includes a first section located opposite the sense element between said first and third conductors and a second section in series with said first section for carrying the same bias current as said first section but in the direction physically opposite to which said current is carried by said first section, said second section being located opposite the sense element between said second and third conductors and wherein the bias conductor is electrically isolated from the sense element to faciliate separate optimization of bias and sense currents for the transducer.

23. In a thin film magnetoresistive transducer array for sensing the magnetic fields recorded on tracks of a magnetic medium, a photolithographically produced biased sensing element structure comprising:

a thin film magnetoresistive sense element corresponding to each track for which recorded magnetic field data is to be sensed;

for each sense element, a first conductor and a second conductor, each said first conductor attached to one end of a sense element and each said second conductor attached to the other end of a sense element;

for each sense element, a third conductor attached to a middle portion of the sense element;

a thin dielectric layer in contact on one side with said sense element; and a bias conductor in contact with the opposite side of said thin dielectric layer and located opposite said sense elements wherein the bias conductor is electrically isolated from the sense elements to facilitate separate optimization of bias and sense currents for the transducer array and wherein said bias conductor includes, for each sense element, a first section and a second section, said first section located opposite the sense element between said first and third conductors and said second section in series with said first section for carrying the same bias current as said first section but in the direction physically opposite to which said current is carried by said first section, said second section located opposite the sense element between said second and third conductors.

24. A structure as in claim 23 wherein said bias conductor further includes for each two adjacent sense elements two jumper connections through the dielectric layer and a section of bias conductor in contact with the side of the thin dielectric layer on which the sense elements are located joining said jumper connections in order to connect the second section associated with one sense element to the first section associated with an adjacent sense element.

25. A structure as in claims 23 or 24 in which the bias conductor is recessed with respect to those edges of the sense elements which are closed to the magnetic medium when said magnetic fields are being sensed by the array.

* * * * *